Nov. 6, 1945.  G. S. BOYD  2,388,521
MULTIPLE WORK SUPPORT
Filed June 21, 1944

INVENTOR.
George S. Boyd,
BY Hull & West,
ATTORNEYS

Patented Nov. 6, 1945

2,388,521

UNITED STATES PATENT OFFICE 2,388,521

MULTIPLE WORK SUPPORT

George S. Boyd, East Cleveland, Ohio

Application June 21, 1944, Serial No. 541,356

1 Claim. (Cl. 82—43)

This invention relates to means for quickly and detachably securing articles varying in external and internal diameters upon a rotatable supporting body whereby portions of the external surfaces of the said articles may be removed and their final surfaces provided with a desired finish.

It is the general purpose and object of the invention to provide a comparatively simple, inexpensive and reliable supporting body for the accomplishment of the purpose specified; also to provide such a body with means whereby a plurality of articles differing in external and internal diameters may be conveniently secured to and removed therefrom, thereby to enable their external surfaces to be treated in the manner specified hereinbefore.

Figure 1:
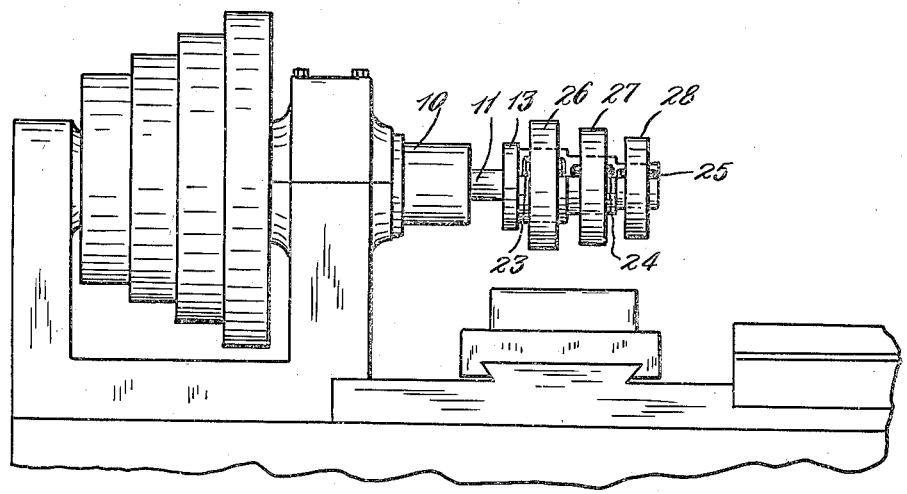
Figures 2, 3:
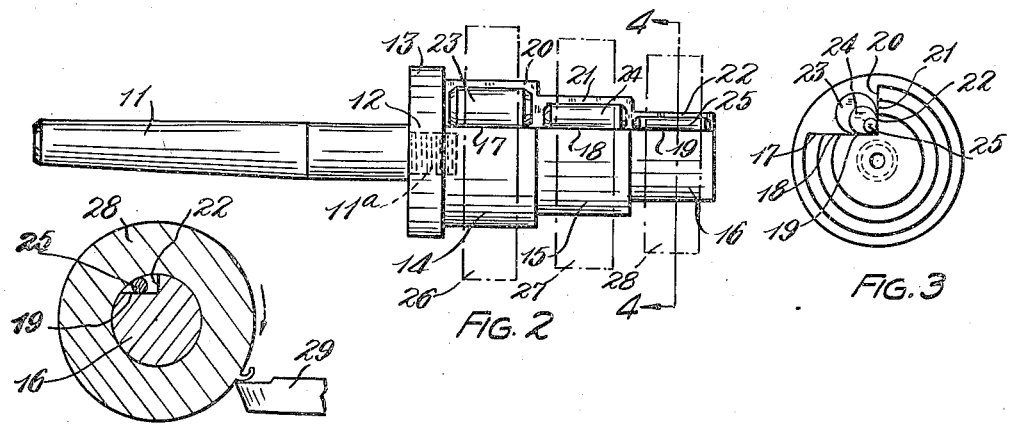
Figures 4, 5:
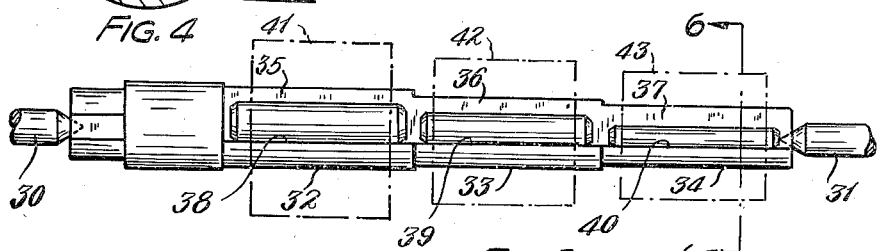

I accomplish the foregoing general objects in and through the construction and arrangement of parts shown in the drawing hereof wherein Fig. 1 represents a side elevational view of a portion of a lathe, the same supporting a rotatable spindle whereon the supporting body embodying my invention is mounted for rotation and showing work pieces mounted upon different supports formed upon said body; Fig. 2 an enlarged side elevational view of the spindle and supporting body shown in the preceding view, the positions of the work pieces thereon being indicated in dot-and-dash lines; Fig. 3 an end elevational view of the supporting body shown in the preceding views; Fig. 4 a view corresponding to the line 4—4 of Fig. 2, looking in the direction of the arrows and showing in full lines the work piece intersected by the section line and also showing the said work piece being operated upon by a cutting tool; Fig. 5 a view, similar to Fig. 2, of a modified form of my work supporting body, showing the same centered, as between the headstock and tailstock of a lathe; and Fig. 6 a sectional view taken on the line 6—6 of Fig. 5 and looking in the direction of the arrows, the sectional view being on an enlarged scale and the work pieces being omitted.

Describing the parts by reference characters, and first in connection with Figs. 1-4 inclusive, 10 denotes the chuck of a lathe of an ordinary type, the chuck having a spindle 11 mounted thereon and the said spindle being provided with a reduced threaded end 11ᵃ and to which threaded end a work-supporting body, indicated generally at A, is secured by means of an axially arranged internally threaded recess 12 in the enlarged end thereof, whereby the said work support is detachably secured to the spindles.

The work supporting body is in the shape of a work center having at its rear, recessed end, a cylindrical base 13 from which there project forwardly three cylindrical work supports of successively diminishing diameter, the said work supports being indicated at 14, 15 and 16. The axis of the body comprising the base 13 and the three work supports is coincidental with the axis of the shank 11. The portion of the body extending forwardly from the base 13 is provided with an angular recess extending inwardly from the peripheries of the cylindrical work supports 14, 15 and 16 and providing an angular recess within each of said supports. One of the walls of each work-support recess is longer than the other and, for convenience of description, this wall in each recess will be referred to as the bottom wall and the other wall will be referred to as the vertical wall. The bottom walls 17, 18 and 19 in all of the work-support recesses are in a common plane extending from their peripheries inwardly to a point where they merge with the vertical walls 20, 21 and 22, the latter walls being all in a common plane and being shorter than the bottom walls. The pairs of walls 17 and 20 of the work support 14, the pairs of walls 18 and 21 of the work support 15, and the pairs of walls 19 and 22 of the work support 16, are adapted to receive in the recesses formed respectively therebetween rollers 23, 24 and 25, each of these rollers being of less diameter than the height of the vertical wall of the recess within which it is received.

The work pieces which are to be supported upon the cylindrical work supports 14, 15 and 16 have each a cylindrical bore of a size which will enable them to be slipped fairly snugly upon their respective supports. These work pieces are indicated at 26, 27 and 28 and are locked to their respective work supports by the rotation of the spindle in the direction indicated by the arrow on Fig. 4, whereby the rollers will traverse the respective bottom walls of the registering recesses until wedged between the same and the internal cylindrical surfaces of the corresponding work pieces, as indicated in Fig. 4, wherein a work piece is shown as being operated upon by a cutting tool 29, it being obvious that the work piece may, of course, be subjected to a grinding action or other reducing and finishing action. When the operation upon the work piece shall have been completed, it can be readily disengaged from its work support by rotating the work piece in a direction to cause the roller to be retracted into the bottom of the recess formed between the walls thereof.

Figure 6:
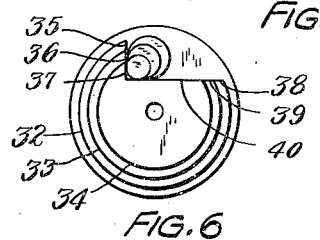

In Figs. 5 and 6 I have shown a modification of the work supporting body wherein the latter is made into the shape of a shank or spindle B adapted to have its ends supported between the headstock and tailstock of a lathe, as indicated at 30 and 31, respectively. This shank or spindle is shown as provided with three cylindrical work supports diminishing successively in diameter from one end to the other of said shank or spindle, these work supports being indicated generally at 32, 33 and 34, respectively. Each of the cylindrical work supports is provided with an angular recess, the recesses being similar to those with which the work supports described hereinbefore are provided, the bottom walls of the said supports being indicated at 35, 36 and 37, respectively, and the vertical walls being indicated at 38, 39 and 40, respectively. As is the case with the recesses provided in the former embodiment of my invention, the bottom walls are all in the same plane and the same is true of the vertical walls, whereby the bottom walls and vertical walls for all of the work supports may be formed by a common cutting or milling operation. The work pieces 41, 42 and 43 are indicated by dot-and-dash lines as mounted upon the work supports 32, 33 and 34, respectively. These work pieces will be clamped to their respective supports in the same manner as is the case with respect to the work pieces in the preceding modification of my invention.

It will be apparent that I have produced a work supporting body which is extremely simple of construction and which is capable of enabling a plurality of pieces of work of different internal diameters to be supported thereon and to be operated upon either simultaneously or individually.

Having thus described my invention, what I claim is:

A rotatable work supporting body having a plurality of cylindrical work supports diminishing in diameter successively from one end of the body toward the opposite end thereof, the body being provided with a single angular recess extending longitudinally thereof and projecting thereinto from the external surface thereof and of such length as to provide an angular recess within each of the cylindrical work supports, the bottom of said recess being parallel to the axis of the body and spaced uniformly therefrom throughout its length, and a roller for the recess in each of the work supports, the said rollers diminishing in diameter corresponding to the diminishing in diameter of the work support and, being adapted, by relative rotation between the said body and work pieces fitted on the cylindrical work supports, to removably lock the work pieces to their respective supports.

GEORGE S. BOYD.